May 1, 1934. R. T. HASLAM 1,956,573
PRODUCTION OF LOW BOILING HYDROCARBONS BY ACTION OF WATER
Filed May 26, 1930
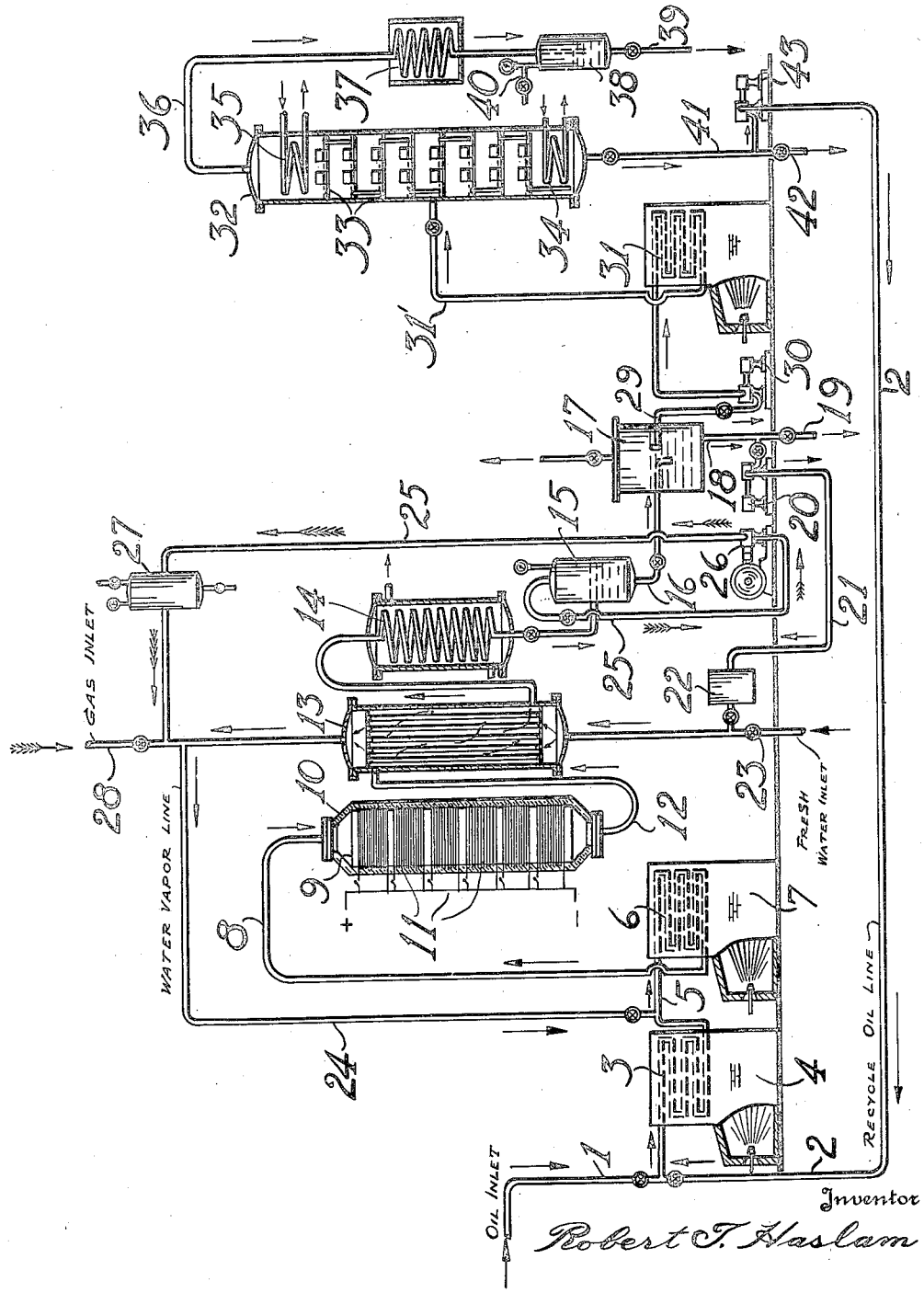
Inventor
Robert T. Haslam
By
W. E. Currie, Attorney Patented May 1, 1934

1,956,573

UNITED STATES PATENT OFFICE 1,956,573

PRODUCTION OF LOW-BOILING HYDRO-
CARBONS BY ACTION OF WATER

Robert T. Haslam, Westfield, N. J., assignor to Standard Oil Development Company, a corporation of Delaware Application May 26, 1930, Serial No. 455,964

10 Claims. (Cl. 196—63)

This invention relates to a process of treating petroleum hydrocarbons in an atmosphere of water vapor under conditions of heat and pressure whereby products of utility in the automotive and other fields are obtained and further relates to the product of such process.

While the invention will be illustrated more particularly by a description of methods of reconstituting a heavier oil, such as gas oil, into lighter products adapted for use as motor spirit or gasoline, I do not wish to be limited because of this illustrative disclosure, since the invention may be utilized other than in this manner, as, for example, in the refining and/or modification of various oils and distillates and other carbonaceous fuels.

Briefly stated, the method in preferred form comprises the transient water-vapor treatment of a carbonaceous fuel, e. g. gas oil, under relatively high pressures and at temperatures preferably above the critical temperature of the oil.

In this way there are formed lighter products of reconstitution which normally are substantially free of heavy polymers and coke-like bodies such as those which characterize the performance of pyrolytic cracking.

The drawing is a diagrammatic representation of one method of conducting my process. Petroleum oil is supplied under pressure through line 1 and may be mixed with recycle oils from the process supplied through line 2. Oil is passed through fired coil 3 in furnace 4 and is heated to any desired temperature below that at which vaporization is appreciable. The heated oil is then mixed in line 5 with superheated steam, the steam-hydrocarbon mixture is passed through a second fired coil 6 in furnace 7 where complete vaporization of the mixture occurs, if not already secured at the time of mixing, and the mixture is heated substantially to the reaction temperature desired, say between 900 and 1300° F. The heated vapor is passed by line 8 into reaction chamber 9 which is suitably designed to withstand the severe operating conditions of temperature and pressure required. This vessel may be covered with a suitable layer of insulating material 10 and may in addition be heated externally or internally by suitable means, for example by electric resistance heaters 11. This reaction vessel is much smaller than those customarily used in the treatment of petroleum at elevated temperatures and pressures and is designed, with regard to the capacity of the fired coils and the rate of flow of material, so that a very short time of contact from about 0.1 minute to 2 minutes is secured. The reaction products are withdrawn by line 12 and cooled in exchanger 13 and cooler 14 and are passed to a liquid and gas separator vessel 15 operating at substantially full pressure. The liquid from this separator is passed by line 16 into an oil-water separator 17. Water is withdrawn by line 18 and may be discarded by line 19 if desired. However, this water may be recirculated by pump 20 and line 21 with or without suitable treatment for the recovery of oxygenated organic compounds at 22. Fresh water may be supplied from an outside source through line 23 and the mixture of fresh and recycled water is preheated in heat exchanger 13 and passed through line 24 into line 5 where it is mixed with the preheated petroleum oil from coil 3.

If it is desired to circulate gas with the steam-hydrocarbon mixture, the fixed gases leaving separator 15 by line 25 may be recompressed by compressor 26 and after suitable treatment at 27 for removal of light hydrocarbon vapors, oxides of carbon, hydrogen sulfide and the like the purified gas may be mixed with water vapor in line 24. Additional gas such as free hydrogen or nitrogen may be supplied under pressure through line 28. The water vapor or mixture of water vapor and gases in line 24 may be subjected to additional preheating, if desired, in a special coil (not shown) before the addition to the preheated petroleum oil vapors in line 5.

The oily product from the oil-liquid separator 17 is removed by line 29 and is passed by pump 30 through preheater 31 into distilling column 32 which may be suitably supplied with bubble cap plates 33, heating coil 34 and cooling coil 35 for purposes of rectification. Low boiling fractions of any desired endpoint, for example, about 435° F., may be withdrawn through line 36, condenser 37, separator 38 and line 39 to storage (not shown). Fixed gases may be released from separator 38 through line 40. The heavy fractions from tower 32 may be withdrawn through lines 41 and 42 to coolers and storage (not shown). These fractions may also be recirculated by pump 43, with or without additional fractionation to remove any small amounts of undesirable higher boiling fractions, through line 2 to oil preheater 3 where they are mixed with fresh oil.

If solid catalysts are used they may be placed in reaction vessel 9 in any desired form such as lumps, screens, grids or baffles and the like. Vaporizable catalysts may be supplied in admixture with any of the fluid materials such as fresh or recirculated oil, water or gas.

Strongly heated water vapor present in a proportion greatly in excess of any seeming reaction requirements, the molecules of which vapor surround in predominating numbers each oil molecule, exercises a favorable orienting action on the latter directing the aquolysis, as the action may be termed, towards the formation of lower boiling bodies without the uncontrolled dehydrogenation leading to coke formation arising in the usual procedure of pyrolytic cracking.

The temperature range of aquolysis ordinarily extends from 900° to 1300° F. Below 900° the aquolyzing action is slow and usually not sufficiently effective from the standpoint of commercial demands. While I do not wish to be precluded from the practice of my invention at temperatures below 900° F., in cases where an adequate degree of reactivity is procurable, as, for example, in the case of highly susceptible oils, or the employment of particularly effective catalysts, I prefer to employ a temperature above that customary in pyrolytic cracking. Using temperatures of 900° F. and upwards it will be noted that I am availing of a region of temperature hitherto generally avoided in the cracking industry because of inordinate losses due to gas and to extensive coke formation. This is particularly true of temperatures above 950°.

By conducting the reconstitution of the oil molecules in an atmosphere of water vapor, that is surrounding and bathing the hydrocarbon molecule with such vapor while maintaining the requisite temperature within the aforesaid region and at the same time applying or attaining a pressure preferably upwards of 100 atmospheres, I am able to aquolize the hydrocarbon and thus to avoid high gas losses together with practical elimination of the formation of coke.

A fairly broad range of pressures may be employed beginning at, say 70 to 100 atmospheres on the one hand and extending to perhaps 300 to 500 atmospheres on the other hand. Pressures of between 150 and 250 atmospheres constitute a good working range. I have employed advantageously a pressure of 200 atmospheres.

Starting with oil and water both in a liquid state I may secure the required pressure simply by the application of heat to these liquids in a confined space. Thus the oil and the water may be fed as an emulsion or may be separately supplied by suitable pressure pumps being forced into a preheating chamber where they are converted to vapors and strongly superheated, preferably to a temperature above the critical temperature of water and thence pass to a region of higher temperatures where reconstitution of the oil molecules takes place in the water vapor atmosphere. Apparatus required for the purpose, therefore, may be very simple, consisting of pumps and heating chambers with suitable condensing means. The liquids are simply pumped against the head or pressure employed in the aquolyzing chamber. Such self-inaugurated pressures tend to a simplification of plant equipment required over that needed in operations where gases such as hydrogen are employed.

In some cases differential heating may be utilized, that is, the temperature of preheat of the oil and water when separately introduced may differ. The water, for example, may be given a preheat which raises it to a relatively high temperature, while the oil may be introduced at a low temperature and on mixing at the time of entry into the reaction chamber the oil will immediately become raised in temperature as it mingles with the more highly heated water. On the other hand, conditions sometimes may require introduction of the oil at a temperature higher than that of the water. Pressures are preferably above the critical point to allow the most favorable conditions for passage of oil and water from liquid to vapor state. The need of transfer of heat to supply latent heat requirements and/or the change in composition of an oil composed of hydrocarbons of differing boiling points by fractional distillation is avoided by conduct of the process at pressures and temperatures above the critical. Oils which if gradually heated would distil in a fractional manner with resultant formation of residues which might, under the conditions imposed, crack and form more or less tarry material and coke, can in this way be transformed directly from liquid to a non-liquid or vapor state, without fractional distillation.

As previously indicated, a proportion of water greatly in excess of that of oil should be used. By this I refer to molecular proportions rather than actual weights. Since I am using gas oil illustratively herein, I shall refer to it in connection with the discussion of oil water ratios. Assuming for gas oil a mean molecular weight of 215 as may be roughly calculated by an observation of average boiling point, a desirable ratio of water to oil is 14:1, that is approximately 14 mols of water would be used to 1 mol of the oil.

Preferably the process is carried out in what may be termed the vapor phase, although this term may not be strictly applicable to bodies maintained under conditions above critical temperature. In any event, the preferred procedure involves the absence of a liquid phase. In pyrolytic cracking polymerization is very much in evidence, but in the present process polymerization judging from the products obtained, is negligible. There is substantially no coke or even tar formation, the heavier liquid product being of substantially the same color and general properties as the oil fed. In some instances it is even improved as to these properties by the treatment and such fractions of the effluent material as boil about the gasoline range, say above 400 or 450° F. may be re-aquolyzed or withdrawn and separately cracked. There are, also, indications of chemical action since small amounts of aldehydes, acids and the like, have been found in the products of reaction.

Although, as above stated, a range of 900°–1300° F. may be employed in carrying out the process, I prefer to use a narrower range of temperatures, in most cases that lying between 1000 and 1250° F. being suitable. Using these temperatures, especially the higher ones, time of exposure of the water vapor and oil stream in the heated zone should be quite limited. Ordinarily I am able to effect reaction to the desired degree by contact of only one-tenth minute to 1 minute, or possibly, in some cases, a two minute period of exposure. In other words, the reaction under the conditions imposed is a very rapid one and conversion therefor progresses with such velocity that a comparatively small heating zone suffices for a large output.

The process is ordinarily conducted in a continuous manner, that is, non-cumulative, but I do not wish to be limited thereto, as in some cases it may prove desirable to carry out the reaction in autoclaves, especially when oils which are quite resistant are being treated and a longer period of aquolyzing exposure is required.

As already indicated, I may employ catalyst to accelerate the reaction, although this ordinarily does not appear to be necessary in view of the velocity of reconstitution which occurs in the absence of catalysts. A volatile body inducing catalytic action sometimes may be employed, introducing this with the feed and allowing it to travel with the stream in which the reaction is taking place. Among substances which may be mentioned applicable in this way are included oidine, ferric chloride, oxides of nitrogen, and the like. Fixed catalysts likewise may be used such as compounds of tungsten, vanadium, molybdenum and so forth. The walls of the chamber in which the reaction takes place in some cases exert a catalytic effect. Ordinarily I prefer to employ a chromium nickel steel as the material of the walls of the reaction chamber, but other forms of steel, alloy steel and other metals capable of withstanding the pressure imposed may be used.

By the treatment of gas oil in this manner there may be obtained a very high proportion of light volatile liquid material boiling within the gasoline range, a heavier residue which normally is not of a tarry nature, and a moderate proportion of gas. The composition of the gas varies somewhat, usually containing a high proportion of saturated hydrocarbons, a lesser proportion of unsaturated hydrocarbons, a small amount of hydrogen, and a still smaller amount of carbon dioxide. As the pressure on the apparatus is increased oxygen in the form of carbon dioxide has been found to decrease which is indicative of the formation of oxygenated liquid hydrocarbons.

The following serves to illustrates the process. Gas oil of a specific gravity .834 was used. On distillation the amount coming over up to 435° F. was found to be 2 percent and at 680° F. 88 percent of the (untreated) oil. A ratio of 14 mols water to 1 mol (mean estimated molecular weight) of the gas oil was used. This mixture was preheated and passed through a reaction zone maintained at 1250° F., the pressure being 2,000 lbs. per square inch. The time of contact in the reaction zone was 20 seconds. On distillation of the product 58.7 percent was found to boil below 435° F. The gas loss amounted to 10.8 percent and consisted mainly of carbon dioxide 0.6 percent, unsaturated hydrocarbons 21.2 percent, saturated hydrocarbons 75.6 percent, and hydrogen 2.6 percent. The residue from the distillation amounted to 29.8 percent. It was not a heavy tarry material such as might be expected in the circumstances, but was rather like the original gas oil in general appearance. The extraordinary character of the residue is characteristic of the products obtained in the preferred form of the invention.

The above proportions were calculated on the volume of the oil admitted to the heating zone.

In another case the mol ratio of water to oil was 34.5:1, the time of contact 11 seconds, pressure 2,000 lbs., temperature 1250° F. Calculated on the oil input the product obtained contained 72 percent anti-knock motor spirit distilling below 435° F. The gas loss was 11.9%. The residue was non-tarry. Tests made on the oil passing through the reaction zone showed presence of aldehydes and alcohols. In the water layer separated from the oil layer traces of aldehydes were indicated also acids.

Careful distillation and rectification of the products of reaction produces in some instances a small proportion of a distillate having an odor resembling benzaldehyde.

As a third example of the operation of my process a gas oil similar to that used above is forced in a pressure of 3000 lbs. per square inch at a temperature of 1200° F. through a reaction zone with steam in molar ratio of 18 steam to 1 of oil. The time of contact was about 13.4 seconds. About 89% of the inlet oil is collected as a liquid product of which 80% boils below 435° F. A fraction boiling below 435° F. has an aniline miscibility point of 37.8° C. and a bromine number of 17½ as determined by the Francis' method—Journal Industrial and Engineering Chemistry, vol. 18, 1926—page 821. The gas loss was much smaller than is obtained by pyrolytic cracking.

Breakdown of water, yielding aldehydes, alcohols, carbon dioxide and other oxygenated products renders hydrogen so released available for reaction with hydrocarbons, thus reducing unsaturation and, if desired, hydrogen may be added along with steam in a free state, although it should be understood that this is not necessary to the operation of the process.

Motor spirit of excellent anti-knock properties may be obtained in this manner. Thus by the present process, a heavy hydrocarbon such as gas oil, can be converted to a substantial degree into lighter liquid hydrocarbons of the anti-knock motor spirit type free from an objectionable content of reaction tar and carbon. There can be obtained a substantially non-tarry oil containing a high proportion of readily separable light motor-spirit having a boiling point range below 400° or 435° F. This product is miscible with normal refinery gasoline and may be blended therewith in various proportions (as, for example, in the ratio of 1:1, 1:2, 1:3 conversely) to furnish liquid fuels of differing anti-knock properties. The product of my invention also may be used as a solvent. The products may be refined and purified in any desired manner, for example with sulfuric acid, alkali or clay. It is generally desirable to use alkali to remove slight traces of acids even where no other treatment is employed. Aldehydes may be removed, if desired, by treatment with sodium bisulphite or the like as will be understood.

This invention is not to be limited by any theory of the mechanism of the reactions nor to any specific example which may have been given for purpose of illustration, but only by the following claims in which I wish to claim all novelty inherent in this invention.

I claim:

1. The process which comprises subjecting a current of water vapor carrying petroleum oil vapors and free from added hydrogen to brief exposure in the absence of a liquid oil or water phase to a temperature of at least 900° F. at a pressure upwards of 100 atmospheres and thereafter separating the oily and the aqueous products of reaction.

2. The process which comprises subjecting a current of water vapor in major proportion carrying petroleum oil vapors in minor proportion and free from added hydrogen to brief exposure in the absence of a liquid oil or water phase to a temperature of between 900° and 1300° F. at a pressure upwards of 100 atmospheres and thereafter separating and rectifying the oil condensate.

3. The process which comprises subjecting a current of water vapor carrying petroleum oil vapors and free from added hydrogen, the molecular ratio of water to oil being at least 14:1, to brief exposure to a temperature of between 1000° and 1250° F. at a pressure of at least 100 atmospheres and thereafter separating the oily aquolyzed products from the aqueous material.

4. The process which comprises subjecting a current of water vapor carrying gas oil vapors and free from added hydrogen to brief exposure to a temperature of at least 900° F. at a pressure upwards of 100 atmospheres and thereafter separating the oily and the aqueous products of reaction.

5. The process which comprises subjecting a current of water vapor in major proportion carrying gas oil vapors in minor proportion and free from added hydrogen to brief exposure to a temperature of between 900° and 1300° F. at a pressure upwards of 100 atmospheres and thereafter separating and rectifying the oil condensate.

6. The process which comprises subjecting a current of water vapor carrying gas oil vapors and free from added hydrogen, the molecular ratio of water to oil being at least 14:1, to brief exposure to a temperature of between 1000° and 1250° F. at a pressure of at least 100 atmospheres and thereafter separating the oily aquolyzed products from the aqueous material.

7. The process which comprises subjecting a current of water vapor carrying heavy petroleum oil vapors and free from added hydrogen to exposure of less than one minute to a temperature of at least 900° F. at a pressure upwards of 100 atmospheres, whereby a substantial proportion of the heavy hydrocarbon is reconstituted into lighter liquid hydrocarbons of the anti-knock motor-spirit type free from an objectionable content of reaction tar and carbon.

8. The process which comprises subjecting a current of water vapor in major proportion carrying heavy petroleum oil vapors in minor proportion and free from added hydrogen to exposure of less than one minute to a temperature of between 900° and 1300° F. at a pressure upwards of 100 atmospheres, whereby a substantial proportion of the heavy hydrocarbon is reconstituted into lighter liquid hydrocarbons of the anti-knock motor-spirit type free from an objectionable content of reaction tar and carbon.

9. The process which comprises subjecting a current of water vapor carrying heavy petroleum oil vapors and free from added hydrogen, the molecular ratio of water to oil being at least 14:1, to exposure of less than one minute to a temperature of between 1000° and 1250° F. at a pressure of over 100 atmospheres, whereby a substantial proportion of the heavy hydrocarbon is reconstituted into lighter liquid hydrocarbons of the anti-knock motor-spirit type free from an objectionable content of reaction tar and carbon.

10. A motor spirit having a boiling point range below 435° F. and separable by distillation from a substantially non-tarry oil produced by the reconstitution of heavier hydrocarbon oils in the presence of an excess of water vapor and free from added hydrogen, the molecular ratio of water to oil being at least 14:1, at a pressure of at least 100 atmospheres, and a temperature between 900 and 1300° F.

ROBERT T. HASLAM.